United States Patent [19]

Malhotra

[11] Patent Number: 4,701,367

[45] Date of Patent: Oct. 20, 1987

[54] COATINGS FOR TYPEWRITER TRANSPARENCIES

[75] Inventor: Shadi L. Malhotra, Mississauga, Canada

[73] Assignee: Xerox Corporation, Stamford, Conn.

[21] Appl. No.: 833,684

[22] Filed: Feb. 27, 1986

[51] Int. Cl.[4] ........................ B32B 27/08; B32B 3/26; B32B 5/18; B41J 33/00

[52] U.S. Cl. .................................... 428/216; 428/483; 428/480; 428/518; 428/519; 428/520; 428/508; 428/510; 400/719; 400/241.1

[58] Field of Search ............... 428/216, 518, 480, 520, 428/519, 508, 483, 510

[56] References Cited

U.S. PATENT DOCUMENTS

| | | | |
|---|---|---|---|
| 3,002,858 | 10/1961 | Neuman et al. | 117/138.8 |
| 3,790,435 | 2/1974 | Tanba et al. | 161/160 |
| 4,233,354 | 11/1980 | Hasegawa et al. | 428/195 |
| 4,301,195 | 11/1981 | Mercer et al. | 427/261 |
| 4,377,611 | 3/1983 | Fischer et al. | 428/520 |
| 4,379,804 | 4/1983 | Eisele et al. | 428/332 |
| 4,461,793 | 7/1984 | Blok et al. | 428/36 |
| 4,474,850 | 10/1984 | Burwasser | 428/336 |
| 4,503,111 | 3/1985 | Jaeger et al. | 428/195 |

FOREIGN PATENT DOCUMENTS

| | | | |
|---|---|---|---|
| 562975 | 9/1958 | Canada | 428/508 |
| 0107468 | 8/1980 | Japan | 428/508 |

*Primary Examiner*—P. C. Ives

*Attorney, Agent, or Firm*—E. O. Palazzo

[57] ABSTRACT

A typewriter transparency with a supporting substrate and thereover a coating blend selected from the group consisting of (1) poly(vinyl methyl ether), and poly(styrene); (2) poly(vinyl methyl ether), poly(styrene) and poly(ethyl acrylate); (3) a styrene-ethylene-butylene-styrene-triblock copolymer; (4) poly(vinyl acetate), and poly(vinyl isobutylether); (5) a styrene-butadiene-styrene triblock copolymer; (6) poly(vinyl methyl ether), poly(vinyl acetate), and poly(ethylacrylate); (7) poly(-hexyl methacrylate) and poly(ethyl methacrylate), and other coatings.

13 Claims, No Drawings

COATINGS FOR TYPEWRITER TRANSPARENCIES

BACKGROUND OF THE INVENTION

The invention is generally directed to transparencies, and more specifically, the present invention is directed to typewriter transparencies with specific coating compositions. Thus, in one embodiment the present invention relates to coatings for transparencies for use with single strike ribbons, correctable ribbons, multistrike ribbons, and fabric ribbons. In one specific embodiment of the present invention there are provided as coatings blends of poly(vinyl methyl ether), and poly(styrene) present on various known polymer substrates including Mylar.

Four types of ribbons known for use in conventional typewriters are fabric based, single strike, multistrike, and correctable. Fabric based ribbons consist of a fabric, such as nylon, polyester or silk doped with mineral or vegetable oil based dyes. An example of a single strike ribbon is Mylar which is coated with a blend of carnauba, bees and paraffin waxes, carbon black pigment and oil. In multistrike ribbons, the inks selected are comprised of blends of carbon black with rape seed oil, Reflex blue pigment and lecithin. Correctable ribbons are usually composed of Mylar coated with a blend of soluble nylon, carbon black and low percent mineral oil. Also, it is known that coatings developed for single strike and correctable ribbons may not be suitable for multistrike and fabric based ribbons.

Transparencies, including typewriter ribbon transparencies, are also known. Related prior art includes U.S. Pat. Nos. 3,002,858; 4,379,804; 4,461,793; 4,474,850; 4,503,111; 3,790,435; 4,233,354; and 4,301,195. There is illustrated in the U.S. Pat. No. 4,301,195 patent a transparent sheet material comprised of a transparent backing having an ink receptive stratum thereon containing, for example, a mixture of two polymers, or individual layers of each polymer. One of the polymers selected is obtained by the reaction of an epoxidized water insoluble neutral rubbery polymer and a water soluble secondary monoamine, reference the abstract of the disclosure. In the '358 patent, there is illustrated an ink receptive coating composition capable of receiving a typewritten image, wherein there can be selected as a coating ethyl cellulose, and a substrate such as Mylar. Reference to column 1, line 12, of this patent indicates that the plastics referred to upon which is intended to present images include transparent, translucent, or opaque sheets, and laminated structures. Also, in the aforementioned '354 patent, there is illustrated printed polyester films with certain properties; and containing on its surface a well adhering printed layer formed by a printing ink with a cellulose derivative as a binder. In the '453 patent, there is described synthetic writing paper comprised of a Mylar base, and a coating thereover including poly(styrene).

Other transparencies similar to those illustrated in the U.S. Pat. No. 4,301,195 patent are disclosed in U.S. Pat. Nos. 4,474,850, and 4,503,111. Furthermore, there is disclosed in U.S. Pat. No. 4,461,793 coatings that can be applied to a heat shrinkable base material which is capable of forming a printing layer thereon. Specifically, reference column 2, line 1, of this patent there is illustrated a printable coating useful for application to heat shrinkable identification devices containing a polyester film, calcium carbonate, and a silicate compound. Apparently, the fiber of the '793 patent is useful as a receiver for typewritten images.

There is also illustrated in a copending application U.S. Ser. No. 695,026, Jan. 25, 1985, now U.S. Pat. No. 4,592,954, entitled Ink Jet Transparencies With Coating Compositions Thereover, the disclosure of which is totally incorporated herein by reference, a transparency for ink jet printing comprised of a supporting substrate; and thereover a coating of a blend of carboxymethyl cellulose, and poly(ethylene oxide). Prior art illustrated in the aforementioned copending application as filed, which may be of interest with respect to the invention of the present application, includes U.S. Pat. Nos. 4,273,602; 4,370,379; and 4,234,644. Disclosed in the '602 patent are heat sensitive recording materials comprised of a support sheet of a thickness of from 5 to 40 microns containing thereon a heat sensitive transfer layer with a phenolic material, a colorless or precolored component which reacts with the phenolic to form a color upon application of heat, and a heat fusible material with a melting point of 40 to 150 degrees Centigrade. It is indicated in this patent that heat sensitive transfer layers can be formed from waxes, or resins of a low molecular weight with colored dyes dispersed therein; however, apparently there are problems associated with such a method in that part of the layer transfers to ordinary paper causing undesirable staining and a decrease in contrast between the letters and the background. Accordingly, the recorded letters cannot be easily read.

Also known is the preparation of transparencies by electrostatic means, reference U.S. Pat. No. 4,370,379, wherein there is described the transferring of a toner image to a polyester film containing, for example, a substrate and a biaxially stretched poly(ethylene terephthalate) film, including Mylar. Moreover, in U.S. Pat. No. 4,234,644 there is disclosed a composite lamination film for electrophoretically toned images deposited on a plastic dielectric receptor sheet comprising in combination an optically transparent flexible support layer, and an optically transparent flexible intermediate layer of a heat softenable film applied to one side of the support; and wherein the intermediate layer possesses good adhesion to the support.

Although the above mentioned transparencies are suitable for their intended purposes, there remains a need for new transparencies. Particularly, there remains a need for typewriter transparencies useful with multistrike ribbons and fabric ribbons, and wherein the coatings selected are compatible with these ribbons. Also, images obtained on materials such as the prior art poly(styrenes) with single strike or correctable ribbons require long fixing times, and are not smudge proof, problems overcome with the transparencies of the present invention.

SUMMARY OF THE INVENTION

It is thus an object of the present invention to provide transparencies which overcome some of the above noted disadvantages.

In another object of the present invention there are provided typewriter transparencies.

Furthermore, in another object of the present invention there are provided coatings for typewriter transparencies that are substantially smudge proof.

In still another object of the present invention there are provided coatings for typewriter transparencies for use with single strike correctable ribbons or multistrike ribbons, which ribbons are incorporated into various typewriters, word processors, and the like.

In yet another object of the present invention there are provided mixtures, or blends of transparency coatings that enable permanent transparencies without image deletion for substantial time periods and which coatings possess other desirable properties.

These and other objects of the present invention are accomplished by providing polymeric coatings for certain substrates. More specifically, in accordance with the present invention there are provided typewriter transparencies useful with single strike ribbons, correctable typewriter ribbons, and multistrike ribbons or fabric ribbons comprised of a supporting substrate, and a coating thereover comprised, for example, of blends of various effective polymers. Specifically, coatings selected for generating high quality correctable typewriter transparencies of the present invention include blends of poly(vinyl methyl ether), and poly(styrene); poly(vinyl methyl ether), poly(styrene) and poly(ethylacrylate); poly(vinyl isobutyl ether), and poly(styrene); poly(vinyl isobutyl ether), and poly(methyl methacrylate); poly(vinyl acetate) and poly(cyclohexyl methacrylate); poly(vinyl methyl ketone), and poly(ethylacrylate); poly(hexyl methacrylate), and poly(ethyl acrylate); and other similar blends. As coatings for transparencies useful for multistrike and fabric typewriter ribbons, there can be selected blends of a styrene-ethylene-butylene-styrene triblock copolymer, available from Shell Corporation as Kraton G-1652, and a styrene-butadiene-styrene copolymer (Kraton DX-1150) in toluene; blends of poly(vinyl acetate), and poly(vinyl isobutyl ether) in toluene; and blends of poly(vinyl methyl ether), poly(vinyl acetate), and poly(ethyl acrylate). Blends of poly(vinyl acetate) and poly(vinyl isobutyl ether), as well as blends of poly(vinyl methyl ether), poly(vinyl acetate) and poly(ethyl acrylate) can also be used for single strike ribbons.

In an important embodiment of the present invention, there is provided a typewriter transparency comprised of a supporting substrate, such as Mylar; and a coating thereover consisting essentially of a mixture with from about 50 to about 70 percent by weight of poly(vinylmethylether), and from about 30 to about 50 percent by weight of poly(styrene). Also, in another embodiment of the present invention there is provided a typewriter transparency comprised of a supporting substrate, such as Mylar; and a coating thereover consisting essentially of a mixture of from about 20 to about 30 percent by weight of poly(vinyl methyl ether), from about 30 to about 40 percent by weight of poly(ethyl acrylate), and poly(styrene) from about 30 to about 50 percent by weight.

Specific preferred coating blends, or mixtures selected for the transparencies useful in single strike systems include (1) about 50 percent by weight of poly(vinylmethyl ketone), and about 50 percent by weight of poly(ethylacrylate); (2) from about 50 to about 75 percent by weight of poly(ethylacrylate), and from about 25 to about 50 percent by weight of poly(methyl methacrylate); (3) from about 50 to about 70 percent by weight of poly(vinyl acetate), and from about 30 to about 50 percent by weight of poly(cyclohexyl methacrylate); (4) from about 50 to about 70 percent by weight of poly(vinyl isobutyl ether), and from about 30 to about 50 percent by weight of poly(methyl methacrylate); (5) from about 50 to about 70 percent by weight of poly(vinyl isobutyl ether), and from about 30 to about 50 percent by weight of poly(styrene); (6) from about 20 to about 30 percent by weight of poly(vinyl methyl ether), from about 30 to about 40 percent by weight of poly(ethyl acrylate), and from about 30 to about 50 percent by weight of poly(styrene); and (7) from about 50 to about 70 percent by weight of poly(vinyl methyl ether), and from about 30 to about 50 percent by weight of poly(styrene).

Specific preferred coating blends, or mixtures selected for the transparencies useful in multistrike and fabric ribbon systems are (1) about 50 percent by weight of a styrene-ethylene-butylene-styrene triblock copolymer (29 percent by weight of styrene), available as Kraton G-1652, and about 50 percent by weight of a styrene-butadiene-styrene triblock copolymer (38 percent by weight of styrene), available as Kraton DX-1150; (2) blends of poly(vinyl acetate) and poly(vinyl isobutyl ether) in toluene; and (3) blends of poly(vinyl methyl ether), poly(vinyl acetate), and poly(ethyl acrylate). These coatings can be utilized in various effective amounts; and are generally present in a solvent such as toluene, the toluene being present in an amount of from about 90 percent by weight to about 95 percent by weight.

As supporting substrates in a thickness of from about 50 to about 100 microns, there may be selected for the coatings illustrated herein, in addition to Mylar, cellophane, poly(vinyl chloride) and cellulose triacetate.

The coatings can be applied to the substrates by various known processes usually, however, in accordance with the present invention, the coatings are applied from a solution having incorporated therein the polymer mixture; and thereafter permitting the air drying thereof. Also, the coating thickness is, for example, of from about 3 to about 7 microns.

With further respect to the present invention, the coatings are usually present in an aliphatic hydrocarbon or aromatic solvent inclusive of methylene chloride and toluene. Generally, the coatings selected are dissolved in the solvents in an amount of from about 5 percent by weight to about 10 percent by weight, however, other amounts of solvent may be utilized providing the objectives of the present invention are achievable.

The following examples are being supplied to further define various species of the present invention, it being noted that these examples are intended to illustrate and not limit the scope of the present invention. Parts and percentages are by weight unless otherwise indicated.

EXAMPLE I

There was prepared a coated transparency Mylar sheet of a thickness of 50 microns by affecting a dip coating of a Mylar sheet into a blend of poly(vinyl methyl ether), 50 percent by weight, and 50 percent by weight of poly(styrene), which blend was present in a concentration of 5 percent by weight in toluene. Subsequent to drying in air, the difference in weight prior to and subsequent to coating was monitored with a thickness gauge; and it was determined that the coated sheet had present on each side 200 milligrams, 3 microns in thickness of the above polymer blend. The coated sheet was then fed into a Xerox Corporation 620 Memorywriter with single strike ribbons, and there was obtained images of high resolution with an optical density of 1:1 as measured with a Weiss Type 05 microscope photometer. These images could not be erased by hand wiping one minute subsequent to their preparation. However, the images resulting were lifted with the correcto-tape of the Xerox 620.

EXAMPLE II

The procedure of Example I was repeated with the exception that there was coated a Mylar sheet with a blend of styrene-ethylene-butylene-styrene triblock copolymer (Kraton G-1652), 50 percent by weight, and styrene-butadiene-styrene triblock copolymer (Kraton DX-1150), 50 percent by weight, which blend was present in a concentration of 10 percent by weight in toluene. The coated sheet had present on each side 500 milligrams of the copolymer in a thickness of 7 microns. Images obtained on this sheet in the Xerox Corporation 620 Memorywriter of Example I, with the exception that it contained multistrike ribbons, had an optical density of 0.75. Images obtained on these coatings in a Smith-Corona typewriter with fabric ribbons also had optical densities of about 0.75.

Other modifications of the present invention will occur to those skilled in the art based upon a reading of the disclosure of the present application and these modifications are intended to be included within the scope of the present invention.

What is claimed is:

1. A typewriter transparency comprised of a supporting substrate and thereover a coating blend selected from the group consisting of (1) poly(vinyl methyl ether), and poly(styrene); (2) poly(vinyl methyl ether), poly(styrene), and poly(ethyl acrylate); (3) styrene-ethylene-butylene-triblock copolymer, and styrene-butadiene-styrene triblock copolymer; (4) poly(vinyl acetate), and poly(vinyl isobutylether); (5) poly(vinyl methyl ether), poly(vinyl acetate), and poly(ethyl acrylate); (6) poly(hexyl methacrylate), and poly(ethyl acrylate); and (7) poly(cyclohexyl methacrylate), and poly(-vinyl acetate).

2. A transparency in accordance with claim 1 wherein the supporting substrate is poly(ethylene terephthalate) in a thickness of from about 50 to about 100 microns.

3. A transparency in accordance with claim 1 wherein the substrate is cellophane.

4. A transparency in accordance with claim 1 wherein the substrate is a cellulose triacetate sheet.

5. A transparency in accordance with claim 1 wherein the substrate is poly(vinyl chloride).

6. A typewriter transparency for single strike ribbons in accordance with claim 1 wherein the blend is comprised of from about 50 to about 70 percent by weight of poly(vinyl methyl ether), and from about 30 to about 50 percent by weight of poly(styrene).

7. A typewriter transparency for single strike ribbons in accordance with claim 1 wherein the blend is comprised of from about 20 to about 30 percent by weight of poly(vinyl methyl ether), from about 30 to about 40 percent by weight of poly(ethyl acrylate), and from about 30 to about 50 percent by weight of poly(styrene).

8. A typewriter transparency for single strike, or multistrike ribbons in accordance with claim 1 wherein the blend is comprised of from about 30 to about 40 percent by weight of poly(vinyl methyl ether), from about 20 to about 40 percent by weight of poly(ethyl acrylate), and from about 30 to about 40 percent by weight of poly(vinyl acetate).

9. A typewriter transparency for single strike ribbons in accordance with claim 1 wherein the blend is comprised of from about 50 to about 70 percent by weight of poly(vinyl isobutyl ether) and from about 30 to about 50 percent by weight of poly(styrene).

10. A typewriter transparency for multistrike ribbons in accordance with claim 1 wherein the blend is 50 percent by weight of styrene-ethylene-butylene-styrene triblock copolymer with 29 percent by weight of styrene, and 50 percent by weight of a styrene-butadiene-styrene triblock copolymer with 38 percent by weight of styrene.

11. A transparency in accordance with claim 1 wherein the thickness of the resulting polymer blend is from about 3 to about 7 microns.

12. A typewriter transparency for single strike ribbons, which transparency is comprised of a supporting substrate, and thereover a coating blend selected from the group consisting of (1) from about 50 to about 70 percent by weight of poly(vinyl isobutyl ether), and from about 30 to about 50 percent by weight of poly(-methylmethacrylate); (2) from about 50 to about 70 percent by weight of poly(vinyl acetate), and from about 30 to about 50 percent by weight of poly(cyclohexyl methacrylate); (3) from about 50 to about 75 percent by weight of poly(ethyl acrylate), and from about 25 to about 50 percent by weight of poly(methyl methacrylate); and (4) from about 30 to about 50 percent by weight of poly(vinyl methyl ketone), and from about 50 to about 70 percent by weight of poly(ethyl acrylate).

13. A transparency in accordance with claim 12 wherein the thickness of the resulting polymer blend is from about 3 to about 7 microns.

* * * * *